W. E. PRALL.
RAILROAD SWITCHES.
No. 181,280.
Patented Aug. 22, 1876.
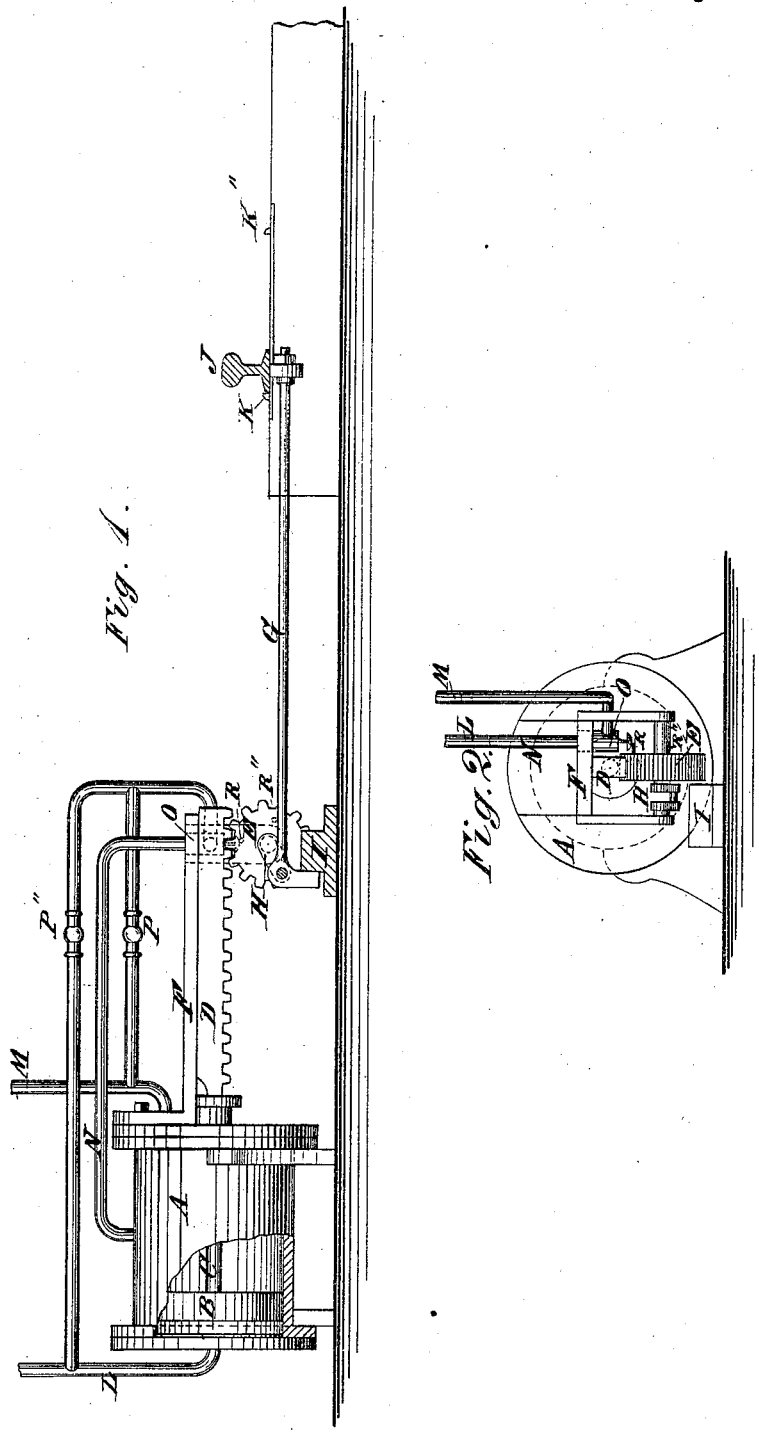

UNITED STATES PATENT OFFICE.

WILLIAM E. PRALL, OF NEW YORK, N. Y.

IMPROVEMENT IN RAILROAD-SWITCHES.

Specification forming part of Letters Patent No. 181,280, dated August 22, 1876; application filed July 26, 1876.

*To all whom it may concern:*

Be it known that I, WM. E. PRALL, of the city and State of New York, have invented a new and useful Improvement in Railroad-Switches, of which the following is a specification:

My invention relates to improvements in that class of railroad-switches which are operated by compressed air; and the improvement consists in a self-acting device by which the play of the piston-rod and switch-bar is positively limited in both directions to the required throw, which is accomplished by attaching the switch-bar, by a crank-pin, to a pinion engaging with a rack on a prolongation of the piston-rod, said pinion having such a number of teeth that the required throw revolves it more than one-half and less than a full revolution. A lug on the switch-bar is thus carried by the revolution of the pinion on alternate sides of a fixed stop, beyond which the lug cannot pass in either direction, by which means the throw is correspondingly limited.

Referring to the drawings, Figure 1 is a sectional, and Fig. 2 a front, view of the apparatus.

A is a cylinder, having an air-tight piston, B, and rod C. D is a cog-rack extension of rod C, and arranged so as to engage the cogged pinion E. F is a support for the pinion E. G is a bar extending from the switch-rail to the crank H on the side of the pinion-wheel E. I is a stop-key, so placed that the lip on the end of bar G will come in contact with one or the other side of it at the end of each stroke, so as to arrest the further movement of the bar G and switch-rail, but not until after the cog-pinion has revolved so far as to carry the crank-pin H past the center-line, the object of this being to cause the back spring of the movable rail of the switch to force the lip tight against the stop-key I, from which it can only be reversed by the admission of air to the piston B, which, by its great force, will revolve the pinion E in the opposite direction and carry the bar-crank H over and down until the lip comes in contact with the other side of the stop-key I, to which position it will again be held by the back spring of the switch-rail until air is admitted to the other side of the piston B, which will reverse it, as before. The lugs K and K″ are to prevent the movement of the switch-rail farther than is necessary to bring it opposite the fixed rail of the track. The pipes L, M, and N and valves O, P, and P″ are for the admission and exhaust of air, and operate as shown and described in my previous patents, the only difference being in the manner of operating the valve or cock o, which in this case is accomplished by placing lugs R and R″ on the side of the cog-pinion, so as to come in contact with the stem of the valve o just before the lip on box G has touched the stop-key I, and, by opening the valve, the air is permitted to enter the exhaust-pipe at one or the other side, L or M, through valves P or P″.

The operation of my invention is as follows: When air is admitted into the pipe M it enters the cylinder A, valve P preventing it from passing to valve or cock O. Piston B will be forced in the direction of pipe L, carrying with it rod C and cog-rack D, which will revolve cogged pinion E and crank H, and carry bar G and switch-rail J in the same direction until the lip of bar G strikes the stop-key I. After the piston B has passed the mouth of pipe N the air enters it and passes to valve O, but is not permitted to escape until after the lug R on pinion E has been forced against the stem of valve O, and has pressed it open, which takes place just before the revolution has been completed. The air will then enter pipe L through valve and branch pipe P″, and pass to the signal placed at the other end of pipe L. The switch-rail will be carried against lug K, so as to be rigidly held from further movement in that direction, and also from any backward movement by the lip of bar G, which is in contact with the stop-key I, until after the air is permitted to enter the cylinder A at the other end, through pipe L, when it will be carried in the opposite direction by the movement of the piston B, rod C, and rack D, acting to revolve the pinion E and crank H, which will carry the bar G and switch-rail J to the lug K″, and, the lip on bar G coming against the other side of the stop-key I, the switch-rail will be firmly secured in the proper position. The air will be permitted to exhaust into pipe M, through valve and branch pipe P, by the lug R″ coming in contact with the stem of valve O. The valve O is so arranged as to close, by its own gravity, so soon as the lug is removed from its stem.

What I claim, and desire to secure by Letters Patent, is—

The cog-rack D and pinion E, in combination with bar G, attached to a movable switch-rail, and so arranged as to give more than one-half of a revolution to the crank connected to the switch-bar before the same shall be arrested, and, when so arrested, that the crank-pin shall be past the center-line, so that a reverse movement will be required to carry the switch-rail to its opposite position, substantially as shown and described.

W. E. PRALL.

Witnesses:
 THERON G. STRONG,
 H. S. JONES.